United States Patent Office 3,090,786
Patented May 21, 1963

3,090,786
PREPARATION OF NITROSAMINES
Dewey Robert Levering, Fairfax, Wilmington, and Lucien G. Maury, Brookside, Newark, Del., assignors to Hercules Powder Company, Wilmington, Del., a corporation of Delaware
No Drawing. Filed Nov. 5, 1954, Ser. No. 467,227
14 Claims. (Cl. 260—293)

This invention relates to a new process for the preparation of nitrosamines and, more particularly, to the synthesis of nitrosamines by the reaction of nitric oxide with a secondary amine.

Nitrosamines have previously been prepared by the reaction of nitrous acid with the amine. In carrying out the reaction the amine is reacted with a nitrite salt in the presence of a mineral acid. A very pure nitrite salt is required and the yields vary from poor to mediocre. Usually the processing and purification of the nitrosamine are difficult. Consequently, this method of preparing nitrosamines is costly and commercially very unattractive.

Now, in accordance with this invention, it has been found that nitrosamines may be prepared by reacting a secondary amine with nitric oxide under superatmospheric pressure. The process is not only carried out very simply and in high yields, but the raw materials and overall processing are much more economical. The process is of wide application and may be used for the preparation of the N-nitroso derivative of any secondary amine.

The following examples will illustrate the process of preparing nitrosamines in accordance with this invention. All parts and percentages are by weight unless otherwise indicated.

Example 1

A 500-ml. stainless steel autoclave was charged with 53.6 g. of N-methylaniline and 100 g. of n-hexane. The autoclave was cooled and evacuated, and after flushing with nitrogen, nitric oxide was added to a pressure of 390 p.s.i. The autoclave was then slowly heated and at 100° C. reaction began. Heating at this temperature was continued and when the pressure fell to 200 p.s.i., the vessel was cooled, vented, and then repressured with nitric oxide to 390 p.s.i. and again heated to 100° C. until the pressure again dropped to 200 p.s.i. The total reaction time was 18 hours. A total of 380 p.s.i. of nitric oxide was observed. After cooling to room temperature, the reaction mixture was removed from the autoclave and distilled. The amount of N-methyl-N-nitrosoaniline so obtained was equal to an 88% conversion and a 98% yield. Identification of the product was made by comparison of its infrared spectrum with that of a known sample of N-methyl-N-nitrosoaniline and by rearrangement of a sample of the product whereby there was obtained the p-nitroso derivative (N-methyl-p-nitrosoaniline) which had a melting point of 118° C.

Example 2

A 500-ml. stainless steel autoclave was charged with 70 g. of diphenylamine and 70 g. of n-hexane. After cooling, evacuating, and flushing the lines with nitrogen, nitric oxide was added to a pressure of 465 p.s.i. The reactor was heated to 135° C., at which temperature the reaction began, and after 8 hours at that temperature 120 p.s.i. of nitric oxide had been absorbed. On isolation of the product by crystallization and filtration, there was obtained N-nitrosodiphenylamine having a melting point of 65° C. and an analysis corresponding to that for $C_{12}H_{10}N_2O$. A sample of the product on rearrangement yielded p-nitrosodiphenylamine (i.e., p-nitroso-N-phenylaniline) having a melting point of 145–146° C.

Example 3

A 500-ml. stainless steel autoclave was charged with 84 g. of piperidine and after evacuating and flushing with nitrogen, nitric oxide was added to a pressure of 150 p.s.i. The reactor was slowly heated and at 26° C. reaction took place. After 3.5 hours at this temperature, 500 p.s.i. of nitric oxide had been absorbed. On distillation of the reaction mixture there was obtained N-nitrosopiperidine in a conversion of 78% and yield of 99%. It had a boiling point of 100° C. at 14 mm. and analysis and infrared spectra of a sample compared with a known sample showed it to be identical to N-nitrosopiperidine.

Example 4

A 500-ml. stainless steel autoclave was charged with 65 g. of diethylamine and after cooling, evacuating, and flushing with nitrogen, nitric oxide was added to a pressure of 250 p.s.i. The reactor was slowly heated to 55° C., at which temperature reaction occurred. After 7 hours at this temperature 500 p.s.i. of nitric oxide had been absorbed. On distillation of the reaction mixture there was obtained a 55.5% conversion to N-nitrosodiethylamine and yield of 94.5%. The product had a boiling point of 47° C. at 5 mm. and $n_D^{20}$ of 1.4388 and a carbon to hydrogen and nitrogen analysis equivalent to that calculated for $C_4H_{10}N_2O$.

Example 5

A 500-ml. stainless steel autoclave was charged with 100 g. of dimethylamine and after nitric oxide was added as described in the foregoing examples to a pressure of 400 p.s.i., the reaction started below $-15°$ C. and continued rapidly until 350 p.s.i. of nitric oxide was absorbed. Distillation of the reaction mixture gave a 51.7% conversion and 66.5% yield of N-nitrosodimethylamine, which may also be named as N-methyl-N-nitrosomethylamine.

Example 6

A 500-ml. stainless steel autoclave was charged with 104 g. of dimethylamine and nitric oxide was added in the manner described in the previous examples to a pressure of 400 p.s.i. Reaction started below $-25°$ C. and continued rapidly as the contents of the autoclave were warmed to room temperature. The reactor was then heated to 70° C. for 10 hours. Distillation of the reaction mixture gave a 77% conversion and a 93.5% yield of N-nitrosodimethylamine.

Any secondary amine may be reacted with nitric oxide under superatmospheric pressure in accordance with this invention to produce the corresponding N-nitroso amine. The foregoing examples have shown the process applied to dialkyl, diaryl, alkyl aryl, and cyclic secondary amines. Nitrosamines may be prepared in the same way from other secondary amines, as, for example, where the two organic radicals attached to the nitrogen may be alkyl, cycloalkyl, aryl, or aralkyl or the radical of a heterocyclic compound and they may be alike or different. They may also be linked together forming a heterocyclic nucleus with the secondary nitrogen, i.e., a heterocyclic compound containing a secondary amino group. The secondary amine may be one containing a second functional group which does not interfere with the reaction between the amino group and the nitric oxide. For example, the secondary amine may be one containing an ether linkage or a halogen-substituted carbon such as a fluorocarbon or chlorocarbon group, etc. Exemplary of the secondary amines that may be converted to nitrosamines in accordance with this invention are dimethylamine, diethylamine, dipropylamine, dibutylamine, N-methyl-ethylamine, N-methyl-isopropylamine, N-ethyl-tert-butylamine, N-methyl-n-hexylamine, dioctylamine, N-ethyl-decylamine, 2-methoxy-1-N-methylamino-ethane, N-methyl-cyclohexylamine, N-propyl-cyclohexylamine, N-cyclohexyl-heptylamine, dicyclohexylamine, N-methyl-abietylamine, N-methyl-dehydroabietylamine, N-methyl-hydroabietylamine, N-methylaniline, N-ethylaniline, N-tert-butylaniline, N-methyl-p-toluidine, N-methyl-1-naphthylamine, diphenylamine, N-methyl-benzylamine, N-phenyl-benzylamine, N-methyl-phenethylamine, N-methyl-furfurylamine, N-methyl-2-furanamine, piperidine, pyrrole, pyrroline, pyrrolidine, indole, carbazole, oxazine, morpholine, 2-N-methylamino-pyridine, etc. There may, of course, be two or more such secondary amino groups in the compound, as, for example, N,N'-dimethyl-ethylenediamine, N,N'-dimethyl-o-phenylenediamine, N,N'-diethyl-p-phenylenediamine, piperazine, etc.

As pointed out above, the reaction is carried out under superatmospheric pressure. The pressure that is required for the reaction will depend upon the amine being reacted, the temperature, and the conversion that is desired. In general, any pressure above atmospheric may be used and preferably a pressure of at least about 20 p.s.i., and more preferably of at least about 100 p.s.i., will be used. The upper limit of the superatmospheric pressure that is used will be set only by practical considerations, such as equipment, etc. In carrying out the reaction, the vessel may be simply pressured with nitric oxide to the desired pressure or a constant pressure of nitric oxide may be maintained by introducing, as needed, additional nitric oxide to compensate for that absorbed in the reaction.

The temperature at which the reaction is carried out will depend entirely upon the amine being reacted, the conversion desired, etc. For example, dimethylamine reacts at a temperature of less than $-25°$ C. to give a 50% conversion, but if the temperature is raised to about $80°$ C., a conversion of above 95% is obtained. In the cases of those amines which react at room temperature or below, as, for example, dimethylamine, diethylamine, and piperidine, there is formed an unstable, solid product which, if allowed to stand at room temperature, decomposes to a yellow oil and this yellow oil on distillation has been found to yield the nitroso derivative along with unreacted amine. Hence, it is believed that this solid product, which is formed at the lower temperature, is a complex between the amine, nitric oxide, and nitrosamine and that when the reaction is carried out at a higher temperature, the complex is unstable so that the unreacted amine is freed and the reaction then proceeds more nearly to completion. In such cases it is then usually desirable to start the reaction at the lower temperature and gradualy increase the temperature as the reaction proceeds. The maximum reaction temperature that may be used is limited only by the stability of the amine being reacted and the nitrosamine being formed. The minimum reaction temperature and the optimum temperature range will, of course, depend upon the amine that is being reacted. In general, the reaction will be carried out at a temperature of from about $-30°$ C. to about $200°$ C. and more preferably between about $20°$ C. and about $170°$ C.

As may be seen from the foregoing examples, the reaction in accordance with this invention may be carried out with or without a solvent for the amine that is reacted or the nitrosamine that is formed. Any organic solvent may be used as a reaction medium if it is desired to carry out the reaction in solution, provided that it is inert to the reactants. Exemplary of the inert organic solvents that may be used are the hydrocarbons such as n-hexane, octane, cyclohexane, benzene, toluene, diethylether, methanol, ethanol, carbon tetrachloride, chloroform, and other inert halogenated hydrocarbons, etc.

Any type of apparatus that is adapted for pressure reactions may be used in carrying out the process in accordance with this invention. The process may be operated as either a batch or continuous process. The product is readily recovered by simply distilling the reaction mixture that is produced to recover any unretcted amine and the nitrosamine.

Nitroso compounds, in general, are used as gasoline and lubricant additives, antioxidants and stabilizers, rubber additives, insecticides, fungicides, and bactericides and as intermediates for pharmaceuticals. For example, N-methyl-N-nitrosoaniline can be rearranged to N-methyl-p-nitrosoaniline which on hydrogenation yields N-methyl-p-phenylenediamine which is a superior gasoline antioxidant. The latter product may be demethylated to yield phenyenediamine which is used widely in the preparation of diisocyanates, dyes, etc. The process of this invention makes it possible to produce these very useful nitroso compounds by a much simpler, more economical, and more commercially attractive process than has been possible in the past.

What we claim and desire to protect by Letters Patent is:

1. In the nitrosation of a secondary amine, the improvement comprising reacting nitric oxide with said secondary amine as the nitrosating agent therefor at a pressure of at least 20 p.s.i.

2. A process of claim 1 wherein said secondary amine is a dialkylamine.

3. A process of claim 1 wherein said secondary amine is a diarylamine.

4. A process of claim 1 wherein said secondary amine is an N-alkylarylamine.

5. A process of claim 1 wherein said secondary amine is dimethylamine.

6. A process of claim 1 wherein said secondary amine is diethylamine.

7. A process of claim 1 wherein said secondary amine is diphenylamine.

8. A process of claim 1 wherein said secondary amine is N-methylaniline.

9. A process of claim 1 wherein said secondary amine is piperidine.

10. In the nitrosation of a secondary amine, the improvement comprising reacting nitric oxide with said secondary amine, as the nitrosating agent therefor, at a temperature within the range of $-30$ to $200°$ C. at a pressure of at least 20 p.s.i.

11. A process of claim 10 wherein said temperature is in the range of 20 to $170°$ C.

12. A process of claim 10 wherein said amine is reacted with said nitric oxide in the presence of an organic solvent inert to said amine and said nitric oxide.

13. A process of claim 10 wherein said pressure is at least 100 p.s.i.

14. In a process of claim 13 introducing the said nitric oxide reactant into the reaction zone under the said pressure and maintaining the said pressure by introducing additional nitric oxide to replace that which has been reacted.

References Cited in the file of this patent

UNITED STATES PATENTS

| 1,967,667 | Hass et al. | July 24, 1934 |
| 2,206,813 | Hass et al. | July 2, 1940 |
| 2,749,358 | Reilly | June 5, 1956 |

OTHER REFERENCES

Riebsomer: "The Reactions of Nitrogen Tetroxide With Organic Compounds," 36 Chem. Revs., pages 157–203. In particular, pages 160, 168–169, 172–173, and 179–180.

Mellor: "A Comprehensive Treatise on Inorganic and Theoretical Chemistry," volume VIII, pages 529–48, Longmans, Green and Co. (1928).

Houben: "Die Methoden der Organischen Chemie," Dritt Auflage, Vierte Band. Georg Thieme/Verlag, Leipzig. Photo-Lithoprint Reproduction by Edwards Brother, Inc. Publishers, Ann Arbor, Michigan, 1944, pages 95–96.